March 11, 1969  V. C. HINES  3,431,947

SAFETY HARNESS FOR FLEXIBLE HOSE AND THE LIKE

Filed May 13, 1966

INVENTOR.
*Vernon C. Hines*
BY
*Richard D. Law*
ATTORNEY

United States Patent Office 3,431,947
Patented Mar. 11, 1969

3,431,947
SAFETY HARNESS FOR FLEXIBLE HOSE
AND THE LIKE
Vernon C. Hines, 2915 S. Lafayette Drive,
Denver, Colo. 80210
Filed May 13, 1966, Ser. No. 549,885
U.S. Cl. 138—106                                    3 Claims
Int. Cl. F16l 3/00

ABSTRACT OF THE DISCLOSURE

A safety harness for high pressure, flexible hoses or the like covers the hose with a diagonally braided covering with both ends of the covering secured to a ring encircling a hose fitting on each end, and a cable secured to the ring is anchored to the supply or receiver vessel. In the event the hose or fitting breaks the covering and anchored cable secures the hose independently of the hose connections.

---

This invention relates to a safety harness for flexible hose, tubing and the like to prevent whipping or threshing of the hose in the event of rupture in the hose or in the connections of the hose.

Flexible hose, tubing and the like are commonly used in many industries, particularly as a temporary conduit for the passage of a fluid from one vessel to another. For example, in the rocket and missile industry flexible hoses are used to transfer fluid fuel components from the supply sources into the fuel tanks of the rockets and missiles. Usually this is a transfer of fluid under relatively high pressures since it is desirable in most instances to load the rockets as fast as possible, usually immediately prior to takeoff. As is well known, the fuel components of the rockets may be corrosive liquids or, in some cases, may be cryogenic liquids (liquefied gases at extremely low temperatures). The flexible hose or tubing in such cases is generally a tube of metal convolutes wrapped with a wire mesh covering. It not infrequently happens, however, that under the pressure of contained fluid the flexible hose ruptures, and, in some instances, the couplings of the hose may rupture or break. Under the influence of the high pressure fluids, the free end of the hose whips, threshes and writhes, and particularly a metal hose whipping at high speeds can be a very deadly weapon. Fatal injuries have occurred from such whipping of the hoses themselves, but the spewing liquid may, also, be a deadly hazard to personnel in the immediate vicinity. The whipping and writhing, loose hose sprays liquid in all directions for some time before the flow can be stopped. The very low temperature liquids as well as the corrosive liquids may be severe hazards to nearby equipment and personnel, causing very painful injuries and even death.

According to the present invention I have provided a safety harness for flexible hose, tubing and the like which provides a means for controlling a flexible hose under rupture conditions, either in the hose itself or in the connection of the hoses to various vessels. The harness, in essence, includes a woven mesh sheath, sleeve or covering for a major portion of the flexible hose, and each end of the wire mesh covering is secured by a lost motion connection to which is attached means arranged for anchoring the covering to or near the vessel to which that end of the flexible hose is connected. The woven wire covering is pulled taut on the hose by the lost motion connection at either end, in the event of a break which pulls the hose away from the anchor, so that the mesh squeezes down on the hose. The anchor means holds the end hose in its approximate position, even under the influence of the high pressure fluid which had been passing through the hose. The harness is, therefore, connected to structures other than the hose connections or the hose and provides a system for securing the hose in place even though ruptured and contains a ruptured hose to prevent spraying fluids in all directions.

Included among the objects and advantages of the present invention is to provide a safety harness for flexible hoses for controlling the same in the event of rupture or breaking of the hose. The main body of the harness of the invention is preferably a diagonally woven sheath, sleeve or covering for the flexible tubing or hose which is arranged under stretching to squeeze down on the contained hose or tubing therein. The harness includes a lost motion connection for the harness sheath at each end thereof to stretch the woven wire sheath so as to provide a squeezing action on the hose in the event of a rupture and movement of the hose while the safety harness is connected between two anchor points. The harness provides means for containing the hose to a defined area as well as containing liquid from a ruptured hose in a defined area.

These and other objects and advantages of the invention may be readily ascertained by referring to the following description and appended illustrations in which.

Figure 1:
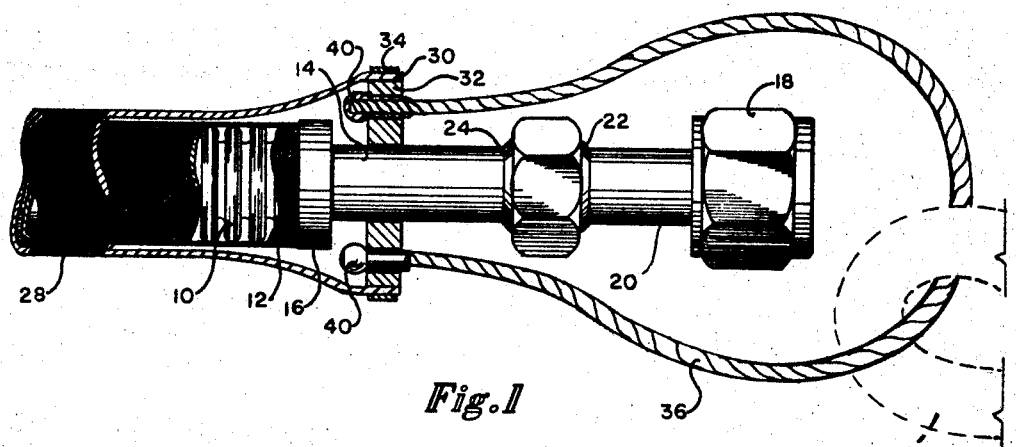
FIG. 1 is a side elevational view, partially in section, of a safety harness according to the invention illustrating its mounting on a flexible hose.
Figure 2:
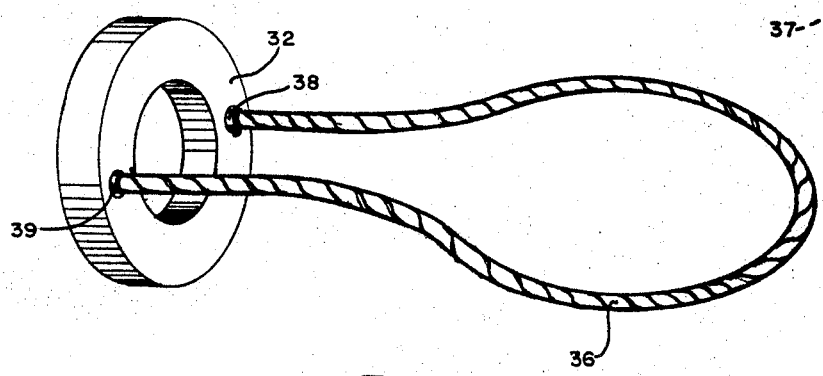
FIG. 2 is an isometric view of the holder for the end of a safety sheath or covering for a flexible tube or hose.

The illustration of FIG. 1 shows a wire-braid covered, metal convolute, flexible hose arranged for connection to a vessel and provided with a safety harness according to the invention. The safety harness, however, is equally adaptable to other types of flexible hose and tubing, such as rubber, plastic, and the like. In FIG. 1, the metal convoluted flexible hose 10 is provided with a woven or braided wire covering 12 as is conventional. A pipe or tube 14 is connected by means of a collar 16 to the flexible hose, and is provided with means for holding a coupling member 18 (which may be of any conventional type of coupling or connection commonly used). Since the coupling part itself does not constitute a part of the invention, detailed description of the same is not believed necessary. The pipe 14 has a length which is considerably longer than the normal connector since it is a part of the harness system. A stop member 20 (in this case a nut, but may be any annular projection) is mounted on the exterior of the tube 14 and is welded into place, as by welds 22 and 24. The stop 20 is preferably welded in place since it must retain a harness holder, as explained below, in the event of rupture of the pipe or the coupling; however, other stop member or connections which might be strong enough could be used. A woven or braided wire sheath or sleeve 28 is telescoped over the entire length of the flexible tube or hose and the sheath 28 may be a loose fit over the tubing for ease of manufacture and assembly. Both ends of the sheath are secured in a similar manner and description of one end is sufficient for both ends. The end 30 of the sheath is passed over a disc or doughnut-shaped member 32 and is rigidly held on the doughnut-shaped member 32 by means of a clamp 34. A length of wire 36 has its ends passed through holes 38 and 39 (FIG. 2) in the member 32 to form a loop and the ends are secured in position by means of cable end retainers 40 on each end of the length of wire 36. The loop 36 is retained, in use, by a relasable clamp 37 to an anchor. The retainers secure the wire in the form of a loop 36 is retained, in use, by a releasable clamp 37 to an is free to slide on the tube 14 between the member 16 and the stop 20. The clamp 34 may be a releasable clamp or a metal strap secured together by a connector forming a tight ring on member 32 holding the sleeve end thereon.

Figure 3:
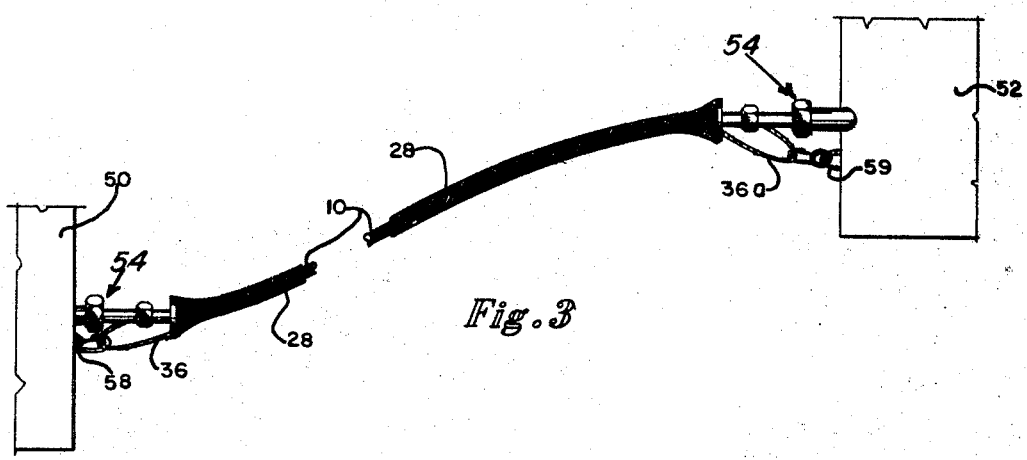
FIG. 3 is a schematic view of a hose connecting one vessel to another vessel, and indicating the connection of a safety harness near such vessels.

For use, as illustrated in FIG. 3, a flexible hose 10, which may be substantially any length, is telescoped in the sleeve 28 and by means of its connectors is mounted between a supply tank 50 and a vessel 52. At the lower end the hose is connected by means of a coupling to an outlet 54 and the wire loop 36 is mounted by means of a clamp (not shown in detail as it may be any conventional releasable clamp hook or the like) to a stationary loop or anchor 58 attached or near to the supply tank. On the upper end, the upper loop 36a is secured by means of a similar clamp to another anchor loop 59 on the vessel 52. With this arrangement the flexible hose is secured in position between the two vessels, whether the couplings are connected or not and even though the hose ruptures or the connections between the hose and the vessels break. The movement of the flexible hose away from either anchor connection stretches the sheath and causes the diagonal weaving of the sheath to draw tight on the hose, securing the same even though the pressure of the fluid passing through the hose attempts to whip the hose. The anchoring of the sheath before the couplings are connected holds the hose in the event that a careless workman drops the hose while trying to secure the coupling. This is very important where contamination of the hose and the couplings is to be prevented.

The wire rope loop 36 may be secured by any conventional clamp to a ring or loop anchor on or near the vessel to which that end of the hose is to be attached. In the case of a missile or a rocket, it may be advantageous to secure the safety harness to the gantry superstructure instead of to the missile itself since generally there are no such rings or loops on the missile itself. Where the supply tank is on a mobile unit, the anchor ring may be secured to the frame of the mobile unit rather than on the tank itself.

The ring 32 may be split, i.e., made in halves for installation on existing hoses. With such a split ring, a metal band may be used to clamp the braided covering to the ring as well as hold the ring together. Additionally the wire of the covering may be unbraided and twisted together to make the loop or bail for holding the hose.

While the invention has been described by reference to a particular embodiment, there is no intent to limit the spirit or scope of the invention so set forth except as defined in the following claims.

I claim:
1. In combination with a flexible hose or the like having connection means on each end thereof, a sheath made of diagonally braided wire mesh telescoped over and covering a major portion of said flexible hose and arranged under stretching movement of said sheath to squeeze down on said flexible hose therein; holding means secured to each end of said sheath; and tie-down means secured to each said holding means and each arranged for temporarily securing to anchor means which is independent of the hose connection means for said hose to a vessel.

2. A combination according to claim 1 in which a length of pipe is secured to each end of said hose; inner and outer stop means on each said pipe; an annular member slidably mounted on said pipe between said stops; each end of said sheath being secured to said annular member; and said holding means at each end being a wire rope secured by each end to said annular member forming a loop for attachment to anchor means.

3. A combination according to claim 2 in which each end of said sheath extends over the outer periphery of said annular member and is secured thereto by a ring clamp.

References Cited
UNITED STATES PATENTS

| | | | |
|---|---|---|---|
| 1,558,878 | 10/1925 | Hitchcock | 138—110 XR |
| 1,671,706 | 5/1928 | Evans | 138—106 XR |
| 2,374,249 | 4/1945 | Wadsworth | 141—383 XR |
| 2,444,988 | 7/1948 | Guarnaschelli | 138—103 XR |
| 2,722,237 | 11/1955 | Rosel | 138—103 XR |
| 3,179,442 | 4/1965 | Lofgren | 138—110 XR |

LAVERNE D. GEIGER, *Primary Examiner.*

BRADFORD KILE, *Assistant Examiner.*

U.S. Cl. X.R.

138—109; 141—383